INVENTORS
DONALD A. BOZANIC
DICKRON MERGERIAN
RONALD W. MINARIK

BY Ernest P. Klipfel
ATTORNEY

United States Patent Office 3,555,407
Patented Jan. 12, 1971

3,555,407
VARIABLE BANDWIDTH SPIN ECHO DELAY LINE
Donald A. Bozanic and Dickron Mergerian, Baltimore, and Ronald W. Minarik, Lutherville, Md., assignors to Westinghouse Electric Corporation, Pittsburgh, Pa., a corporation of Pennsylvania
Filed June 11, 1969, Ser. No. 832,115
Int. Cl. G01n 27/00; H03h 7/30
U.S. Cl. 324—.5
11 Claims

ABSTRACT OF THE DISCLOSURE

A delay line for microwave frequency signals utilizing apparatus for producing an electron spin echo signal from an RF input signal in conjunction with an anisotropic spin echo sample situated in a magnetic field in order to obtain a variable electron spin resonant absorption line width. This is accomplished by means of a crystalline quartz spin echo sample configured in a plurality of thin layers or laminations of a predetermined thickness with means for varying the orientation of the slabs with respect to one another in a static, unidirectional and substantially homogeneous magnetic field so that the crystallographic axis orientation of each layer is controlled relative to the direction of the applied magnetic field so that a spreading out of the composite absorption line or narrowing of the line can be achieved by varying the alignment of the laminations in a selected manner.

BACKGROUND OF THE INVENTION

Field of the invention

This invention relates to electron spin echo circuitry which utilizes the principles of the spin echo phenomenon which is presently well known in the art and is described in various publications and patents, an example of which is U.S. Pat. 2,887,673, issued to E. L. Hahn.

In a typical apparatus a paramagnetic sample of material is located in a static unidirectional magnetic field for a sufficient period of time so as to be in thermal equilibrium so that the resultant magnetic moment present in the material becomes aligned in the direction of the field. If an RF field or first pulse of RF energy having a frequency equal to the characteristic or Larmor frequency of the sample is applied at right angles to the field, a torque is applied to the magnetic moment which causes it to be tipped away from the direction of the field. The angle of tipping, that is the angle between the moment and the direction of the field is proportional to the magnitude of the field and the time during which the RF field exists. Upon release of the displacing force, the spinning nuclei urged toward realignment by the force of the field, rotate or precess about the field in much the same manner as a tipped gyroscope. The sample is then subjected to another field or second pulse of electromagnetic energy directed normal to the main field. After a quiescent period the sample develops spontaneously a magnetic field of its own which is also normal to the main field and which rotates around the latter's direction. The strength of this rotating field builds up to a maximum and then decays. This field is detected as a "spin echo" signal.

Although earlier systems were directed to nuclear spins, recent attention has been directed to electron spin systems. The difference between electron and nuclear spin systems is the difference in the Larmor frequencies of the particles due to their mass. Since the mass of the electron is several times smaller than the mass of the proton, the precessional frequency of a spinning electron is in the vicinity of 2.8 mHz. per oersted as compared to 4.3 mHz. per oersted of the proton. Therefore, the speed of response of an electron spin system to an imposed RF magnetic field pulse is several magnitudes faster than a proton base system.

The precessional or Larmor frequencies of electrons therefore lie in the microwave frequency range. This results in placing an electron spin echo sample in a microwave cavity situated in strong uniform magnetic field and then coupling a pair of successive microwave pulses, generally referred to as the 90° and 180° pulses to the sample at substantially right angles to the magnetic field. After a time substantially equal to the separation between the 90° and 180° pulses a spin echo signal appears which is coupled out of the cavity.

Description of the prior art

It is well known that an electron spin resonance absorption line or Larmor frequency is dependent upon not only the orientation of the paramagnetic sample within the magnetic field but also upon the homogeneity of the field itself according to the following relationship:

$$h\nu = g\beta H$$

where $h$ is Plank's constant, $\nu$ is the frequency of the resonance line, $g$ is a constant dependent on sample orientation within the magnetic field, $\beta$ is the Bohr magnetron and H is the magnetic field strength.

Heretofore, it is generally known that the bandwidth of the resonance line can generally be changed by applying an inhomogeneous magnetic field thereto. One such teaching is U.S. Pat. 3,265,961 granted to W. B. Mims. A device for producing an inhomogeneous field is further taught by U.S. Pat. 3,418,538 issued to T. Roman.

Additionally, apparatus for changing the orientation of a paramagnetic resonance material with respect to the magnetic field is shown in U.S. Pat. 3,242,427 issued to M. R. Kagan. This patent is directed to a tunable microwave cavity wherein the relative orientation of the sample being tested for paramagnetic resonance is changed with respect to a steady low frequency or DC magnetic field so that the amount of energy applied to the electrons in the various transition levels is changed in response to the vector cross product of the low and high frequency fields.

While the methods and apparatus disclosed in the prior art provide desired results, inherent limitations exist as to the control and possible operating range of a spin echo system which is intended to provide variability of the resonance characteristic over a relatively broad frequency band. Whereas the Mims disclosure is directed to the establishment of differential Larmor precession frequencies by means of an inhomogeneous field, the present invention is directed to means for controlling the frequency bandwidth by controlling the orientation of a multiple layer sample within a homogeneous field.

SUMMARY

Briefly, the subject invention comprises a means for varying the bandwidth of the Larmor frequencies of an electron spin echo sample by using a sample consisting of a plurality of thin layers having a predetermined width arranged in a stacked configuration with means for selectively varying the relative orientation of at least one layer relative to a fixed layer for obtaining separate and different orientations with respect to the Zeeman field when located in a spin echo system. The specimen is selected to be anisotropic so that the change of relative orientation within the magnetic field effects the width of the resonant field. Additionally, the anisotropic sample comprising the thin layers is located in a microwave cavity which is adapted to be placed in a static unidirectional magnetic field. The cavity comprises one element of a microwave frequency delay line wherein an input microwave pulse is applied thereto as well as an RF frequency source actuated by said input pulse which generates a "recall" pulse having a bandwidth equal to or greater than the input pulse after a predetermined time interval. By selective adjustment of the orientation of the layers of the specimen within the magnetic field a spin echo signal is generated having substantially the same bandwidth as the input pulse.

DESCRIPTION OF THE PREFERRED EMBODIMENT

Figure 2:
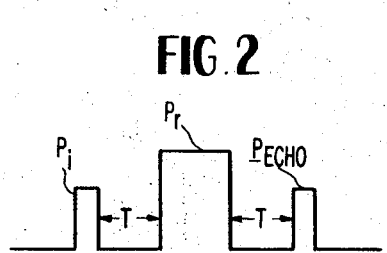
FIG. 2 is a diagram illustrative of the timed relationship of the signals present in a spin echo system.
Figure 1:
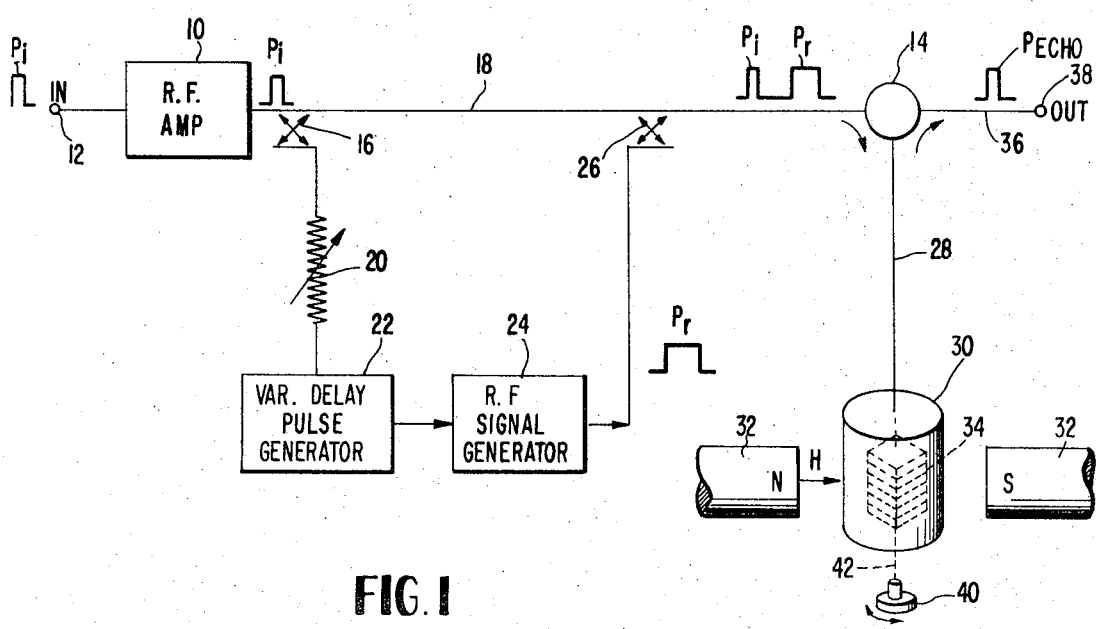
FIG. 1 is a block diagram of the preferred embodiment of the subject invention.

Referring now to the drawings, FIG. 1 is a block diagram of the preferred embodiment of the subject invention which discloses means for obtaining an output of a microwave frequency signal having a predetermined time delay from a microwave input signal. This apparatus utilizes the phenomenon of electron spin echo signals resulting from the application of successive 90° and 180° microwave signals separated by a predetermined time interval into a paramagnetic spin echo material located between a magnetic field. A spin echo signal will be produced after a time equal to the separation between the successive microwave pulses and will have a bandwidth the same as the first or incident pulse $P_i$ if the bandwidth of the second or recall pulse $P_r$ is greater than the bandwidth of the incident pulse $P_i$, and, secondly if the bandwidth of the absorption line of the spin echo sample is greater than the bandwidth of the incident pulse $P_i$. The embodiment shown in FIG. 1 discloses such as means. The apparatus shown in FIG. 1 includes an RF amplifier 10 coupled to an input terminal 12 which is adapted to receive an input or incident microwave pulse $P_i$. The incident pulse $P_i$ is coupled to a circulator 14 and the waveguide coupler 16 by means of the waveguide circuit 18. A portion of the incident pulse $P_i$ is coupled to the waveguide coupler 16 which is then fed through a variable attenuator 20 and to a variable pulse generator 22. The variable pulse generator 22 is coupled to an RF signal generator 24 which produces a second microwave pulse $P_r$ having a predetermined bandwidth greater than $P_i$ and separated in time from the incident pulse $P_i$ by a time interval T. This is shown by reference to the diagram shown in FIG. 2. The recall pulse $P_r$ is coupled back into the waveguide circuit 18 by the coupler 26 so that both the incident pulse $P_i$ and the recall pulse $P_r$ are commonly fed to one port of the circulator 14 which is then coupled to the waveguide circuit 28. The waveguide 28 feeds into a microwave cavity 30 disposed between the pole pieces of a permanent magnet 32. A spin echo sample 34 of paramagnetic material is located inside the microwave cavity 30 between the pole pieces of the permanent magnet 32.

When the microwave pulses $P_i$ and $P_r$ are applied to the spin echo sample 34 at substantially right angles to the magnetic field H produced by the permanent magnet 32, a spin echo signal $P_{echo}$ will be produced after a second time interval T which is then fed back to the circulator 14 by means of the waveguide 28 and out of the circulator by means of another port which is coupled to the waveguide circuit 36 which is adapted to transfer the echo signal $P_{ecoo}$ to an output terminal 38.

The present invention is particularly directed to the spin echo sample 34. As stated above, a spin echo sample will exhibit one or more Larmor frequencies giving rise to spectral absorption line, the line width of which depends not only on the type of material used, but also on the strength and homogeneity of the field applied and on the sample orientation within the field. The line widths of electron spin resonance absorption lines vary anywhere from 0.06 mHz. to in excess of 100 mHz. However, the absorption lines which are of particular interest regarding an electron spin echo system are those which are nearer the narrow line width portion of the range. Characteristically, this places a requirement of relatively long spin-lattice relaxation time in the materials selected for the spin echo samples. One example of a desirable electron spin echo sample is irradiated crystalline quartz which exhibits line widths ranging from 0.6 mHz. at liquid helium temperatures to approximately 3 mHz. at ambient room temperature.

Figure 3:
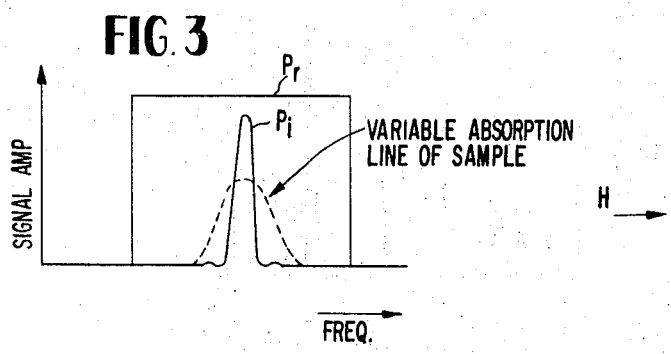
FIG. 3 is a diagram of waveforms helpful in understanding the subject invention.

Referring now to FIG. 3, there is disclosed a diagram illustrating the superposition of the microwave pulses comprising the incident pulse $P_i$ and the recall pulse $P_r$. What is intended to be shown is that the recall pulse $P_r$ is relatively wide, i.e., has a frequency bandwidth sufficient to encompass the bandwidth of any incident pulse $P_i$ within a predetermined range. The spin echo signal $P_{echo}$ will be a reproduction of the incident pulse $P_i$ if the bandwidth or more correctly, the composite resonant absorption line of the sample 34 as shown in FIG. 3 is sufficiently broad to include all the frequencies contained in the incident pulse $P_i$, and the bandwidth of the recall pulse is greater than or equal to that of $P_i$. When this condition exists, a spin echo signal will be produced which is substantially a reproduction of the incident pulse $P_i$.

Figure 4:
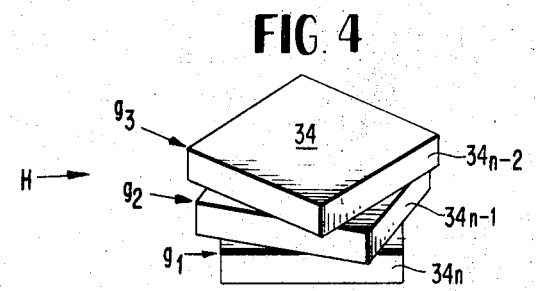
FIG. 4 is a perspective view of a multiple layer spin echo sample having an anisotropic characteristic in response to a magnetic field.
Figure 5:
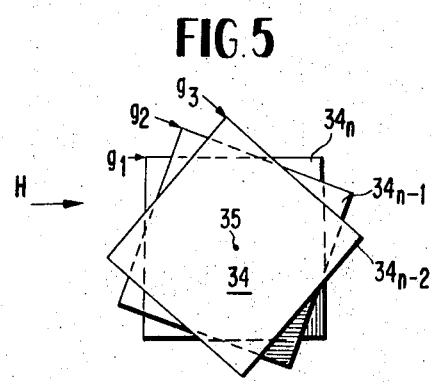
FIG. 5 is a top plan view of the plurality of layers of the spin echo sample shown in FIG. 4.

Accordingly, the subject invention contemplates providing means for controlling the composite line width of the electron spin absorption line as shown by FIG. 3 by locating a magnetically anisotropic spin echo sample 34 which may be of crystalline quartz in a substantially uniform or homogeneous or magnetic field. Referring now to FIGS. 4 and 5, the spin echo sample 34 is comprised of a plurality of $n$ identical layers or thin slabs shown comprising layers $34_{n-2}$, $34_{n-1}$ and $34_n$ which are respectively rotatable about a common central axis 35. Furthermore, mechanical adjustment means shown comprising a thumb screw member 40 is mechanically coupled to the sample 34 by means of a suitable mechanical coupling means shown schematically by reference numeral 42 so that the edges of the $n$ layers can be displaced while keeping one layer, for example, $34_n$ fixed. By locating the sample 34 comprising a plurality of substantially identical layers within a unidirectional, homogeneous magnetic field H which may be provided by the permanent magnet 32, the line width may be selectively varied by changing the orientation of the layers $34_{n-2}$, $34_{n-1}$ and $34_n$ within the magnetic field H by rotating one or more of the layers about its central axis 35 by means of the thumb screw 40.

Since any Larmor frequency of a spin echo sample can be expressed by the equation $h\nu = g\beta H$, the frequency can be changed by variation of the term $g$ which is dependent upon the orientation of the anisotropic sample 34. Moreover by providing a plurality of $n$ layers of the sample 34, the $g$ term of each of the layers can be selectively changed by the amount of the rotation of each of the layers relative to the field vector H. The narrowest line width will be achieved when all of the $n$ layers are perfectly aligned with every other layer so that substantially all of the crystallographic axes coincide. This line width can then be spread out thereby increasing the bandwidth of the echo by rotating one or more of the layers relative to one another while maintaining at least one of the layers in a fixed position within the magnetic field.

This is further schematically illustrated in FIGS. 4 and 5 wherein the value of $g$ is of a different value, for example, $g_1$, $g_2$, etc. for different positions of the corners of layers $34_{n-2}$, $34_{n-1}$ and $34_n$ within the field H. This is what is meant by the anisotropic nature of the sample 34. Secondly, it has been noted above that crystalline quartz is a desirable material because it does have an anisotropic characteristic. When the material is configured in a plurality of thin slabs, each slab will have a separate bandwidth characteristic which extends over a predetermined frequency band and the entire configuration will exhibit a composite bandwidth.

What has been shown and described, therefore, is an electron spin echo apparatus including a spin echo sample which is adapted to provide a controlled variable bandwidth of the echo signal produced.

While the subject invention has been shown and described with what is at present considered to be the preferred embodiment of the subject invention, the above detailed specification is not meant to be interpreted in a limited sense, since all equivalents, alterations and modifications coming within the spirit and scope of the present inventon are herein meant to be included.

We claim as our invention:

1. In an electron spin echo system wherein a first and a second RF pulse separated by a predetermined time interval is applied to a spin echo sample of paramagnetic material located in a unidirectional magnetic field substantially orthogonal to the application of said pair of RF pulses, the improvement comprising:
   an anisotropic spin echo sample comprising a plurality of separate layers stacked one upon the other within said unidirectional magnetic field; and
   means coupled to said layers for changing the orientation of at least one of said plurality of layers with respect to another layer of said plurality of layers within said magnetic field for changing the composite line width of the sample.

2. The invention as defined by claim 1 wherein said first and second RF pulses are comprised of microwave frequency pulses, and additionally including:
   a microwave cavity wherein said anisotropic spin echo sample is located; and
   means for feeding said first and second microwave pulses into said cavity and for feeding a spin echo signal out of said cavity.

3. The invention as defined by claim 1 wherein said plurality of layers of paramagnetic material are comprised of the same matetrial.

4. The invention as defined by claim 3 wherein each layer of said plurality of layers are substantially identical.

5. The invention as defined by claim 4 wherein said plurality of layers have a common rotatable axis and wherein said means for changing the orientation of said plurality of layers comprises means for selectively rotating at least one of said plurality of layers about said axis while maintaining at least one layer of said plurality of layers in fixed position.

6. The invention as defined by claim 5 wherein said axis of rotation is substantially orthogonal to the unidirectonal magnetc field.

7. The invention as defined by claim 5 wherein said means for changing the orientation of said plurality of layers is adapted to provide spreading of the spin resonant absorption line substantially over the bandwith of said second RF pulse.

8. The invention as defined by claim 1 and additionally including:
   circuit means for receiving said first RF pulse as an input; and
   circuit means for generating the second RF pulse at a predetermined interval after receipt of the first RF pulse, said second RF pulse additionally having a bandwith equal to or greater than the bandwith of said first RF pulse.

9. The invention as defined by claim 8 wherein said means for changing the orientation of at least one of said plurality of layers comprises means for rotating at least one of said layers with respect to another layer about an axis intersecting the magnetic field for varying the bandwidth and center frequency of the Larmor frequencies of said sample to substantially coincide with the frequency spectrum of said first input pulse.

10. The invention as defined by claim 9 wherein said first and said second RF pulses comprise microwave frequency pulses and said spin echo sample comprises a plurality of thin layers of quartz crystal.

11. The invention as defined by claim 1 wherein said unidirectional magnetic field comprises a substantially homogeneous magnetic field through said sample.

References Cited

UNITED STATES PATENTS

| | | | |
|---|---|---|---|
| 2,887,673 | 5/1959 | Hahn | 324—0.5X |
| 3,147,427 | 9/1964 | Uarian | 324—0.5 |
| 3,155,941 | 11/1964 | Mims | 340—173 |
| 3,396,349 | 8/1968 | Rider | 333—70 |

MICHAEL J. LYNCH, Primary Examiner

U.S. Cl. X.R.

333—24, 29